(12) United States Patent
Jennings et al.

(10) Patent No.: US 9,201,715 B2
(45) Date of Patent: Dec. 1, 2015

(54) EVENT OVERFLOW HANDLING BY COALESCING AND UPDATING PREVIOUSLY-QUEUED EVENT NOTIFICATION

(75) Inventors: Cheryl L. Jennings, Austin, TX (US); Rajeev Mishra, Bangalore (IN); Trishali Nayar, Pune (IN); Lance W. Russell, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/427,159

(22) Filed: Mar. 22, 2012

(65) Prior Publication Data

US 2012/0198477 A1  Aug. 2, 2012

Related U.S. Application Data

(63) Continuation of application No. 12/879,365, filed on Sep. 10, 2010.

(51) Int. Cl.
*G06F 9/44* (2006.01)
*G06F 9/54* (2006.01)

(52) U.S. Cl.
CPC .......... *G06F 9/542* (2013.01); *G06F 2209/546* (2013.01)

(58) Field of Classification Search
None
See application file for complete search history.

(56) References Cited

U.S. PATENT DOCUMENTS

| | | |
|---|---|---|
| 5,721,825 A | 2/1998 | Lawson et al. |
| 6,038,563 A | 3/2000 | Bapat et al. |
| 6,064,656 A | 5/2000 | Angal et al. |
| 6,185,613 B1 | 2/2001 | Lawson et al. |
| 6,411,967 B1 | 6/2002 | Van Renesse |
| 6,591,317 B1 * | 7/2003 | Schzukin et al. ............... 710/52 |
| 6,631,363 B1 | 10/2003 | Brown et al. |
| 6,778,504 B2 | 8/2004 | Santry et al. |
| 6,862,619 B1 | 3/2005 | Sugauchi et al. |
| 6,983,324 B1 | 1/2006 | Block et al. |
| 7,058,957 B1 * | 6/2006 | Nguyen ....................... 719/318 |
| 7,308,689 B2 | 12/2007 | Black et al. |
| 7,542,437 B1 | 6/2009 | Redi et al. |
| 7,571,230 B2 | 8/2009 | Gissel et al. |

(Continued)

OTHER PUBLICATIONS

Final Office Action in U.S. Appl. No. 12/879,365, mailed on Feb. 26, 2013, 21 pages (pp. 1-21 in pdf).

(Continued)

*Primary Examiner* — H S Sough
*Assistant Examiner* — Carina Yun
(74) *Attorney, Agent, or Firm* — Mitch Harris, Atty at Law, LLC; Andrew M Harris; Parashos T. Kalaitzis (57) ABSTRACT

An event notification method for distributed processing systems provides reduction of queue space and event processing bandwidth associated with duplicate events such as a particular event that is duplicated and results in multiple event notifications propagated for multiple consumers. When a duplicate event notification is received at an input to an event notification queue, rather than queuing the duplicate event notification, a sequence number of the event notification already in the queue is updated to indicate to the event consumer, exactly how many duplicate events have been received. The timestamp of the updated event notification may also be set to the timestamp of the most recently received duplicate event notification.

20 Claims, 4 Drawing Sheets

(56) References Cited

U.S. PATENT DOCUMENTS

| | | | |
|---|---|---|---|
| 7,650,404 B2 | 1/2010 | Parupudi et al. | |
| 7,664,125 B1 | 2/2010 | Bauer et al. | |
| 7,856,480 B2 | 12/2010 | Muchow | |
| 7,913,105 B1 | 3/2011 | Ganesh et al. | |
| 8,108,715 B1 | 1/2012 | Agarwal | |
| 8,161,053 B1* | 4/2012 | Khan et al. | 707/749 |
| 8,384,549 B2 | 2/2013 | Lemmon | |
| 8,433,760 B2 | 4/2013 | Ganapathy et al. | |
| 8,484,472 B2 | 7/2013 | Sherkin et al. | |
| 8,634,330 B2 | 1/2014 | Ganapathy et al. | |
| 2002/0178275 A1 | 11/2002 | Hein et al. | |
| 2003/0061340 A1 | 3/2003 | Sun et al. | |
| 2003/0088831 A1 | 5/2003 | Bauer et al. | |
| 2003/0093516 A1 | 5/2003 | Parsons et al. | |
| 2003/0105801 A1 | 6/2003 | Tse et al. | |
| 2003/0225840 A1 | 12/2003 | Glassco et al. | |
| 2004/0008727 A1 | 1/2004 | See et al. | |
| 2004/0030775 A1 | 2/2004 | Lauzon et al. | |
| 2004/0064835 A1 | 4/2004 | Bellwood et al. | |
| 2004/0172467 A1 | 9/2004 | Wechter et al. | |
| 2005/0050098 A1* | 3/2005 | Barnett | 707/104.1 |
| 2005/0065953 A1* | 3/2005 | Bower et al. | 707/101 |
| 2005/0076145 A1 | 4/2005 | Ben-Zvi et al. | |
| 2005/0152396 A1 | 7/2005 | Pichna et al. | |
| 2005/0172162 A1 | 8/2005 | Takahashi | |
| 2005/0234929 A1 | 10/2005 | Ionescu et al. | |
| 2006/0031282 A1 | 2/2006 | Tuttle et al. | |
| 2006/0087409 A1* | 4/2006 | Korzeniowski | 340/286.02 |
| 2007/0041328 A1 | 2/2007 | Bell, IV | |
| 2007/0140243 A1 | 6/2007 | Eastham | |
| 2007/0226182 A1 | 9/2007 | Sobotka et al. | |
| 2007/0282959 A1 | 12/2007 | Stern | |
| 2008/0008106 A1 | 1/2008 | Boberg et al. | |
| 2008/0077635 A1 | 3/2008 | Sporny et al. | |
| 2008/0183857 A1 | 7/2008 | Barfield et al. | |
| 2008/0317050 A1 | 12/2008 | Xiong et al. | |
| 2009/0043887 A1 | 2/2009 | Coekaerts | |
| 2009/0138808 A1 | 5/2009 | Moromisato et al. | |
| 2009/0192965 A1 | 7/2009 | Kass | |
| 2009/0199051 A1 | 8/2009 | Jann et al. | |
| 2009/0288089 A1 | 11/2009 | Choi et al. | |
| 2010/0077310 A1 | 3/2010 | Karachale et al. | |
| 2010/0094922 A1 | 4/2010 | Sathish | |
| 2010/0099447 A1 | 4/2010 | Boberg et al. | |
| 2010/0113072 A1 | 5/2010 | Gibson et al. | |
| 2010/0153528 A1 | 6/2010 | Pearson et al. | |
| 2010/0223492 A1 | 9/2010 | Farrugia et al. | |
| 2010/0274885 A1 | 10/2010 | Yoo et al. | |
| 2010/0281304 A1* | 11/2010 | Moyer et al. | 714/37 |
| 2010/0290469 A1 | 11/2010 | Assarpour | |
| 2010/0332277 A1 | 12/2010 | Dentzer et al. | |
| 2011/0035462 A1 | 2/2011 | Akella | |
| 2011/0041140 A1 | 2/2011 | Harm et al. | |
| 2011/0093743 A1 | 4/2011 | Arcese et al. | |
| 2011/0145639 A1 | 6/2011 | Farahmand et al. | |
| 2011/0202500 A1* | 8/2011 | Warn et al. | 707/607 |
| 2011/0274053 A1 | 11/2011 | Baik et al. | |
| 2012/0036250 A1 | 2/2012 | Vaswani et al. | |
| 2012/0047257 A1 | 2/2012 | Hauser | |
| 2012/0144018 A1 | 6/2012 | Fried et al. | |
| 2012/0203897 A1 | 8/2012 | Mishra et al. | |
| 2012/0203899 A1 | 8/2012 | Ganapathy et al. | |
| 2013/0042001 A1 | 2/2013 | Gould et al. | |

OTHER PUBLICATIONS

Office Action in U.S. Appl. No. 12/879,365 mailed on Oct. 25, 2012.

Office Action in U.S. Appl. No. 12/879,365 mailed on Oct. 25, 2012, 21 pages (pp. 1-21 in pdf).

* cited by examiner

EVENT OVERFLOW HANDLING BY COALESCING AND UPDATING PREVIOUSLY-QUEUED EVENT NOTIFICATION

The present application is a Continuation of U.S. patent application Ser. No. 12/879,365, filed on Sep. 10, 2010 and claims priority thereto under 35 U.S.C. 120.

BACKGROUND

1. Field of the Invention

The present invention is related to handling of event notification overflow or potential overflow conditions in computer systems, and more specifically to handling of duplicate events so that additional queue space is not required.

2. Description of Related Art

In large-scale distributed computer systems, such as those using distributed software models to perform tasks, multiple nodes provide independent execution of sub-tasks. In order to keep such a system operational, and further, to provide indication of events occurring at one node that either require a reaction from another node or indicate to the other node that either an erroneous operating condition has occurred, or that a phase of processing is complete. In particular, event notification and event logging are operations used to indicate system health to system administrators or software applications, including operating systems components.

Health monitoring techniques employed in distributed processing systems perform an important function in that connections to other nodes must be reliable and all of the active nodes that have been assigned tasks need to perform those tasks in order to ensure that the totality of the processing requirements are met, and in a timely fashion. The health of a node-based distributed processing system is typically monitored by: 1) a heartbeat messaging system, which passes messages between the nodes and a central monitoring component; and 2) an event notification system that signals interested nodes when events occur on other nodes. Event notification systems in node-based distributed processing systems typically require an interested application (a consumer) to register to receive event notifications either with a centralized event manager, or with the processes or objects that generate the events (an event producer).

Events in such a system may be reported multiple times. For example, an event may be reported for each interested event consumer. With the large number of events that may be generated, in particular where the event itself is triggered multiple times due to a resource change or a hardware or media failure, a large number of duplicate events may be buffered at a node, causing event queue overflow and/or consuming processing bandwidth that could be used to handle other events. While the duplicate events could simply be removed from the queue, information about how many events have occurred and the timing of the events may be lost.

BRIEF SUMMARY

The invention provides an event notification method that is embodied in a computer-performed method that provides queuing of events to event consumers, while coalescing duplicate events.

When a duplicate event notification is detected at the input to a queue that stores event notifications for delivery to an event consumer, rather than queuing the event notification, a previously-received event notification is updated by incrementing the sequence number of the previously-received event notification. Therefore, when the event consumer receives the event notification, the event consumer can determine exactly how many events the coalesced event notification represents. The timestamp of the event notification may also be updated to match the timestamp of the most recently-received duplicate event notification.

The foregoing and other objectives, features, and advantages of the invention will be apparent from the following, more particular, description of the preferred embodiments of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION

The present invention encompasses techniques for event notification in clusters of nodes within distributed computing systems. In particular, embodiments of the invention can be used to reduce event processing bandwidth and storage requirements by coalescing duplicate events that are being queued for delivery to event consumers. Information about how many duplicate events is preserved by incrementing a sequence number within the event notification when a duplicate event is combined with a previously queued event notification. The timestamp of the event notification can be updated with the timestamp of the most recently received duplicate event.

Figure 1:
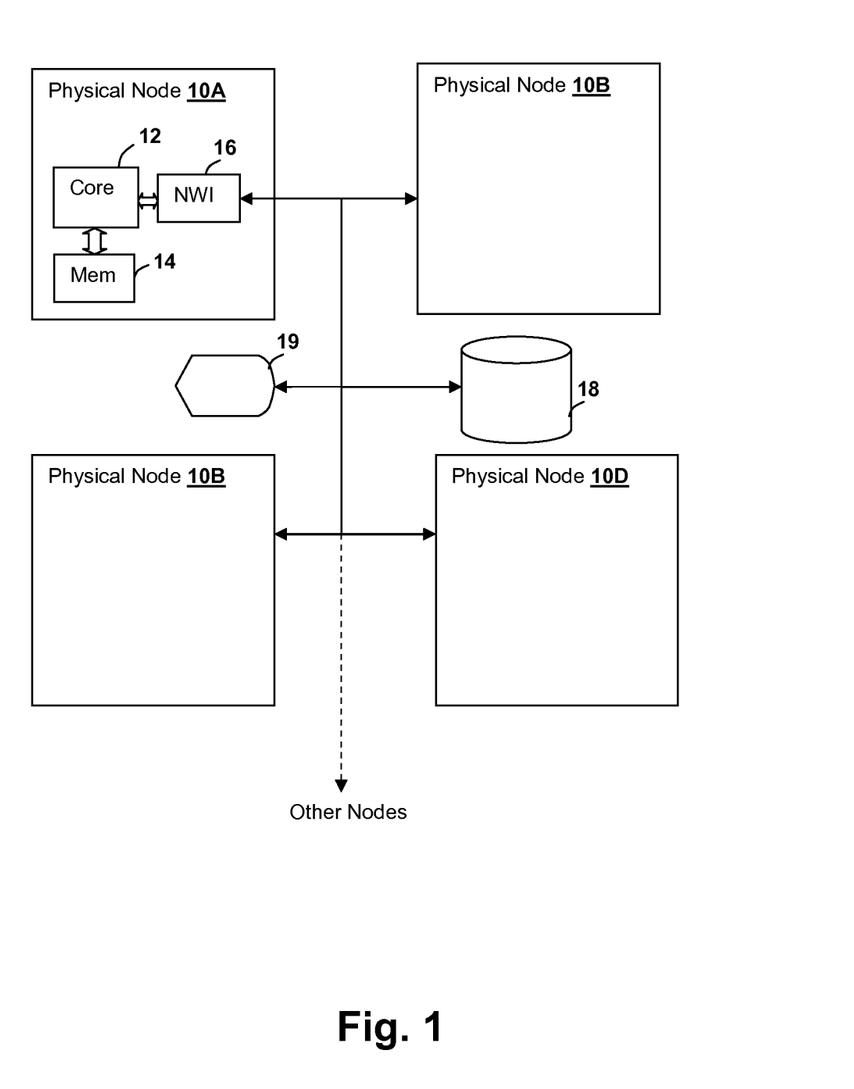
FIG. 1 is a block diagram of a distributed computer system in which techniques according to an embodiment of the present invention are practiced.

Referring now to FIG. 1, a distributed computer system in accordance with an embodiment of the present invention is shown. A first physical processing node 10A includes a processor core 12 coupled to a memory 14 that stores program instructions for execution by processor 12. The program instructions include program instructions forming computer program products in accordance with embodiments of the invention that provide event notification between either physical processing nodes 10A-10D, virtual processing nodes partitioned within the depicted computer system as will be described in further detail below, or both. Processing node 10A also includes a network interface (NWI) 16 that couples processing node 10A to a wired, wireless or hybrid network, which may be a standardized network such as Ethernet, or a proprietary network or interconnect bus. Other processing nodes 10B-10D are of identical construction in the exemplary embodiment, but embodiments of the invention may be practiced in asymmetric distributed systems having nodes with differing features. Although only four compute nodes 10A-

10D are illustrated, a distributed computer system in accordance with an embodiment of the present invention will generally include a large number of compute nodes connected via one or more networks. The distributed computer system of FIG. 1 also includes other resources such as I/O devices 19, including graphical display devices, printers, scanners, keyboards, mice, which may be coupled to the network or one of nodes 10A-10D via workstation computers that provide a user interface to administrative personnel and other users. Nodes 10A-10D are also coupled to storage devices 18, for storing and retrieving data and program instructions, such as storing computer program products in accordance with an embodiment of the invention.

Figure 2:
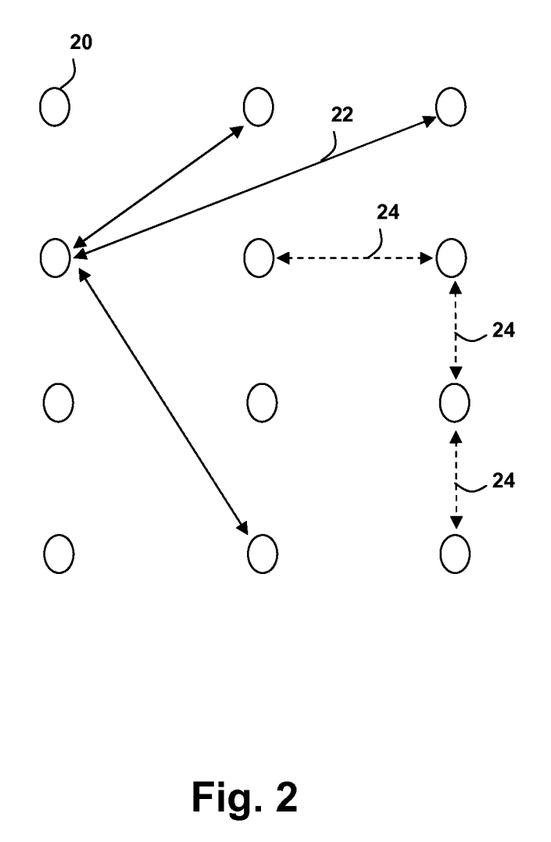
FIG. 2 is a pictorial diagram depicting communication between nodes of a computer system in accordance with an embodiment of the present invention.

Referring now to FIG. 2, communication between multiple nodes 20 of the distributed computer system of FIG. 1 is shown. As mentioned above, nodes 20 may correspond exactly on a one-to-one basis with processing nodes 10A-10D (and other nodes) of FIG. 1, or nodes 20 may be partitioned in a different manner as virtual processing nodes. For example, a single node 20 may have exclusive use of multiple processing nodes, e.g. nodes 10A-10B, and result in a system having a greater number of virtual nodes than processing nodes, or alternatively, multiple nodes 20 may be implemented on a single processing node, e.g., node 10A. In the present invention, each of nodes 20 represents at least one operating system image and one or more applications executing within the operating system image. In general, the entire system as depicted may execute a single application, but sub-tasks within the application are apportioned to the various nodes 20, which may be identical sub-tasks or different sub-tasks. The present invention concerns event notification within the computer system of FIG. 1, in which events are communicated between nodes 20 via event notification messages. Other messages are also passed between nodes 20, including data and program code transmissions, and messages as needed to support features of embodiments of the present invention, such as indications to remote nodes that event notifications of a particular event type are of interest to another node. A separate physical network may be provided for administrative tasks such as event notification and heartbeat messaging, or the same physical networks may be used. Nodes are generally arranged in a cluster, which is a group of virtual or physical processing nodes organized to perform a particular task or group of tasks, e.g., for a particular customer. As illustrated, communication between nodes in a cluster may be accomplished by direct node to node communications 22 or by next-neighbor communications 24 in which nodes 20 pass along messages to other nodes 20. Another alternative is to use a central facility for inter-node communication. However, since the present invention provides a high availability event notification system having low latency, it is generally preferable not to use a central clearinghouse for events and other messages.

While event notification in accordance with embodiments of the present invention may be implemented using a variety of event notification mechanisms, such as direct object-to-object interfaces, using operating system-maintained signaling object such as semaphores, in the depicted embodiment, the event notification is provided by a special file system that implements an event manager. Event consumers, i.e., the applications or objects interested in receiving event notifications, register to receive event notifications by calling file operation functions/methods on an interface to the file system. Event producers notify the file system of events via a separate application programming interface (API) provided by the event manager. The event manager then provides the event notifications to the event consumers interested in the particular events represented by the event notifications. In the depicted embodiment, the file system is a kernel extension, which facilitates availability and uniformity of the event manager at each node in the system. Further details of a file-system based event manager are provided in U.S. Patent Application Publication U.S. 200901991051, which is incorporated herein by reference. The event notification system the "Autonomic Health Advisor File System" (AHAFS) disclosed in the above-incorporated U.S. patent application does not provide direct event notification between the nodes, so a separate layer is used for inter-node event communication. The generic methods open( ) and write( ) described below are understood to include specific file operations fopen( ) and fwrite( ) as alternatives, or other operations provided in a file system interface that can be used to provide the same type of information flow.

Figure 3:
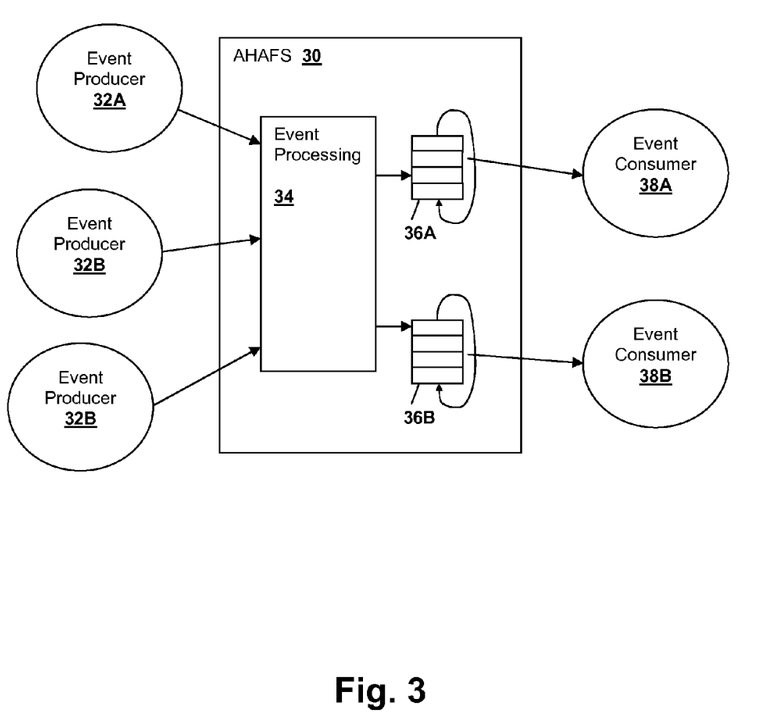
FIG. 3 is a pictorial diagram depicting information flow in a computer system in accordance with an embodiment of the present invention.

Referring now to FIG. 3, information flow within an event notification system according to an embodiment of the invention is shown. Event producers 32A-32C generate event notifications that are provided to an event processing block 34 within an AHAFS software component 30, which is generally distributed among nodes 20. Instances of an AHAFS interface on each node 20 receive event notifications from event producers 32A-32C and either queue them for local consumption or transmit them for remote consumption. AHAFS software component 30 also receives remote event notifications from remote instances of AHAFS interfaces. Both local events and remote event notifications are queued by AHAFS software component 30 in per-consumer queues 36A and 36B, which are implemented as circular buffers in the depicted embodiment, but may alternatively be implemented using other type of storage organization. Event consumers 38A-38B process events de-queued from their corresponding queues 36A and 36B, and perform any responsive actions.

The present invention provides reduction in processing overhead and the chance of overflow of queues 36A and 36B, by detecting that a duplicate event notification is about to be inserted in one of queues 36A and 36B, and altering the event notification to indicate to the corresponding event consumer 38A-38B, the number of event notifications represented by the modified event notification, and the timestamp of the latest such event notification received.

TABLE I

| | |
|---|---|
| Event Notification Tag | |
| Event type (per consumer) | e |
| Event sequence number | 1 |
| Timestamp | |
| Event Data . . . | |
| End Tag | |

Table I above illustrates an event notification received for a first event e, which has an event sequence number of 1. If additional identical event notifications having the same data are received, the AHAFS according to an embodiment of the present invention will increment the event sequence number for each duplicate event that is then received and discarded. When the corresponding event consumer processes the event notification, the consumer can determine the number of event notifications received by the value of the event sequence number. Since the field (event sequence number) used to store the indication that more than one event has been received is a field already within the event notification, the event consumers do not have to handle a new/different format that includes additional fields to indicate a duplicate event. Therefore, the same parsing format can be used to interpret the event notification, since the coalesced event notification has the same format as an individual event notification.

The event consumer can also determine the most recent occurrence of the event by noting the timestamp, which has been replaced with the timestamps of the incoming event notifications as they are received and discarded. In the particular embodiment depicted herein, if a different event notification is received between duplicate event notifications, then the more recent event notifications are not discarded, so the event consumer can rely that no other events have transpired between the event notifications that have been coalesced. The updating of timestamps can be user settable in accordance with an embodiment of the present invention to update with the latest timestamp, or retain the timestamp of the first occurrence of the event, which may be selected on a per-customer basis. As another alternative embodiment, event consumers, when registering to receive notifications for a particular event, may be provided the option of specifying a flag, e.g., TIMESTAMP=FIRST or TIMESTAMP=LAST, which in the depicted embodiment are written to the file that represents the event. The flag indicates, for each event consumer and on a per event-type basis, whether the timestamp field is updated with each received event notification that is coalesced, or whether the original timestamp is preserved.

Figure 4:
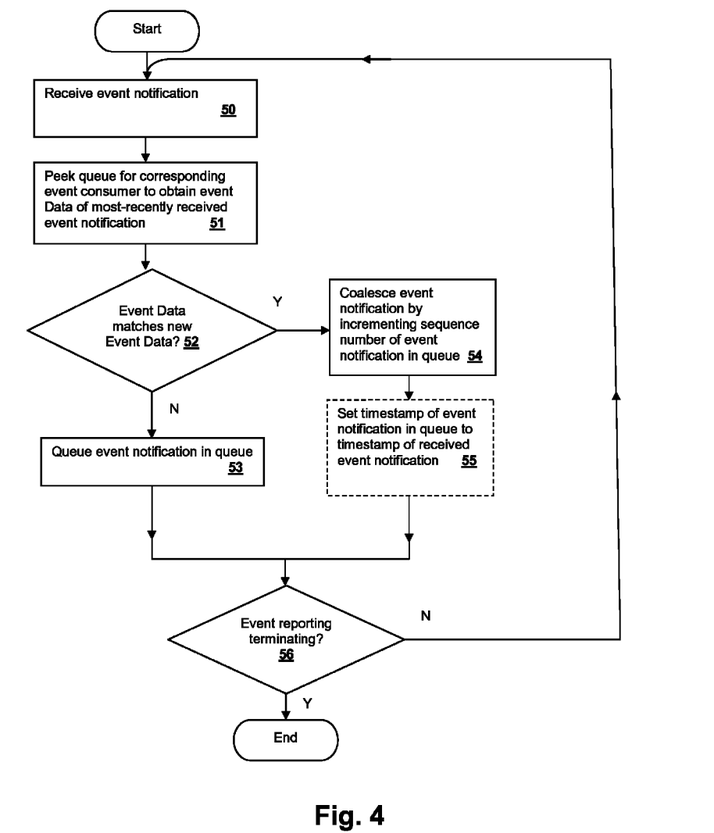
FIG. 4 is a flowchart of a method in accordance with an embodiment of the present invention.

Referring now to FIG. 4, a method in accordance with an embodiment of the invention is shown in a flowchart. When an event notification is received for an event consumer (step 50), the corresponding queue tail is peeked (step 51) to determine if the event data matches the event data of the event notification received in step 50 (decision 52). If the event data matches (decision 52), the event notifications are coalesced by incrementing the sequence number of the event stored in the queue tail (step 54) and the timestamp of the event received in step 50 is optionally used to replace the timestamp in the queue tail event notification (step 55). Whether or not the timestamp is replaced can be determined from a user-settable flag that indicates whether timestamp updating should be employed. If the event data does not match (decision 52), then the received event notification is enqueued in the queue (step 53). Until event reporting is terminated (decision 56) the process of steps 50-56 are repeated as event notifications arrive at each queue.

As noted above, the present invention may be embodied as a system, method, and/or a computer program product. A computer program product may be embodied in firmware, an image in system memory or another memory/cache, stored on a fixed or re-writable media such as an optical disc having computer-readable code stored thereon. Any combination of one or more computer readable medium(s) may be used to store the program instructions in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Further, while the illustrative embodiment is directed to an AIX (AIX is a trademark of IBM) or other type of UNIX operating system (UNIX is a trademark of The Open Group), in which the event notification is provided by a mountable file system provided as a kernel extension, it is understood that the techniques of the present invention can be applied in event monitoring systems executing under any operating system and can be implemented using proprietary or standardized signaling interfaces as an alternative to the file system interface provided in the depicted embodiments.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method for event notification within a computer system processing cluster comprising a plurality of physical or virtual processing modes, the method comprising:
   receiving event notifications corresponding to events occurring on one or more of the processing nodes;
   queuing the received event notifications in one or more queues for delivery to event consumers;
   coalescing duplicate event notifications in a single resulting event notification, wherein the event notifications contain a event sequence number stored therein, wherein the coalescing further increments the event sequence number by modifying the event sequence number stored in the single resulting event notification to yield a modified event notification that, when provided to one of the event consumers indicates to the one of the event consumers, a total number of original and duplicate events that have been received, and wherein the coalescing further modifies a timestamp stored in the single resulting event notification to match a timestamp stored in a most recent one of the duplicate event notifications, by reading the timestamp of the most recent one of the duplicate event notifications and writing a value of the timestamp of the most recent one of the duplicate event notifications to a storage location of the timestamp stored in the single resulting event notification; and
   at the event consumer, determining whether the event notifications have been duplicated one or more times by reading the event sequence number stored in the event notifications to determine whether the event notifications have been modified to indicate the total number of original and duplicate events that have been received.

2. The method of claim 1, wherein the coalescing only coalesces sequential duplicate events.

3. The method of claim 2, wherein the coalescing comprises:
  responsive to the receiving having received an event notification;
  peeking in a corresponding queue to determine whether a most recently queued event notification is a duplicate of the received event notification;
  responsive to the peeking determining that the most recently queued event notification is not a duplicate of the received event notification, queuing the event notification in the corresponding queue without altering the sequence number of the event notification; and
  responsive to the peeking determining that the most recently queued event notification is a duplicate of the received event notification, incrementing the sequence number of the most recently queued event notification without queuing the received event notification in the queue.

4. The method of claim 3, further responsive to the peeking determining that the most recently queued event notification is a duplicate of the received event notification, updating a timestamp of the most recently queued event notification.

5. The method of claim 1, wherein the modifying of the timestamp is performed selectively in response to a predetermined setting that directs the coalescing to update event notification timestamps, wherein if the predetermined setting is not set, the coalescing does not modify the timestamp of the single resulting event notification to match the timestamp of the most recent of the duplicate event notifications.

6. The method of claim 1, wherein the event notifications are received as callbacks to an application programming interface provided by the file system that implements at least a portion of the event notification method, and wherein the queuing is performed in response to receiving the callbacks.

7. The method of claim 5, further comprising:
  during registration by the event consumer to receive notification of events of a given event type, specifying a flag that indicates for the given event type and the event consumer, whether the timestamps of coalesced event notifications of the given event type and for the event consumer are to be updated with the timestamp of received event notifications, or whether original timestamps should be preserved, wherein the coalescing only modifies the timestamp stored in the single resulting event notification if a flag corresponding to an event type and event consumer of the single resulting event notification has been previously set during registration of the event consumer.

8. A computer system comprising a processing cluster including a plurality of physical or virtual processing nodes, the computer system comprising at least one processor configured to execute program instructions and at least one memory coupled to the processor and storing the program instructions, wherein the program instructions are program instructions that provide event notification within the computer system, the program instructions comprising:
  program instructions that receive event notifications corresponding to events occurring on one or more of the processing nodes;
  program instructions that queue the received event notifications in one or more queues for delivery to event consumers;
  program instructions that coalesce duplicate event notifications in a single resulting event notification, wherein the event notifications contain an event sequence number stored therein, wherein the program instructions that coalesce further increment the event sequence number by modifying the event sequence number stored in the single resulting event notification to yield a modified event notification that, when provided to one of the event consumers indicates to the one of the event consumers, a total number of original and duplicate events that have been received, and wherein the program instructions that coalesce further comprise program instructions that modify a timestamp stored in the single resulting event notification to match a timestamp stored in a most recent one of the duplicate event notifications, by reading the timestamp of the most recent one of the duplicate event notifications and writing a value of the timestamp of the most recent one of the duplicate event notifications to a storage location of the timestamp stored in the single resulting event notification; and
  program instructions that, at the event consumer, determine whether the event notifications have been duplicated one or more times by reading the event sequence number stored in the event notifications to determine whether the event notifications have been modified to indicate the total number of original and duplicate events that have been received.

9. The computer system of claim 8, wherein the program instructions that coalesce comprise program instructions that only coalesce sequential duplicate events.

10. The computer system of claim 9, wherein the program instructions that coalesce comprise:
  program instructions that, responsive to the program instructions that receive having received an event notification, peek in a corresponding queue to determine whether a most recently queued event notification is a duplicate of the received event notification;
  program instructions that, responsive to the program instructions that peek having determined that the most recently queued event notification is not a duplicate of the received event notification, queue the event notification in the corresponding queue without altering the sequence number of the event notification; and
  program instructions that, responsive to the program instructions that peek to having determined that the most recently queued event notification is a duplicate of the received event notification, increment the sequence number of the most recently queued event notification without queuing the received event notification in the queue.

11. The computer system of claim 10, further comprising program instructions that, responsive to the program instructions that peek having determine that the most recently queued event notification is a duplicate of the received event notification, update a timestamp of the most recently queued event notification.

12. The computer system of claim 8, wherein the program instructions that modify a timestamp are selectively executed in response to a predetermined setting that directs the program instructions for coalescing to update event notification timestamps, wherein if the predetermined setting is not set, the program instructions that coalesce do not modify the timestamp of the single resulting event notification to match the timestamp of the most recent of the duplicate event notifications.

13. The computer system of claim 12, wherein the program instructions further comprise program instructions that, during registration by the event consumer to receive notifications of events of a given event type, specify a flag that indicates for the given event type and the event consumer, whether the timestamps of coalesced event notifications of the given event type and for the event consumer are to be updated with the timestamp of received event notifications, or whether original timestamps should be preserved, wherein the program instructions that coalesce only modify the timestamp stored in the single resulting event notification if a flag corresponding to an event type and event consumer of the single resulting event notification has been previously set during registration of the event consumer.

14. The computer system of claim 8, wherein the event notifications are received as callbacks to an application programming interface provided by the file system that implements at least a portion of the event notification method, and wherein the program instructions for queuing are executed in response to receiving the callbacks.

15. A computer program product comprising a computer-readable memory device storing program instructions for execution within a computer system, the computer system comprising a processing cluster including a plurality of physical or virtual processing modes, wherein the program instructions are program instructions that provide event notification within the computer system, the program instructions comprising:
   program instructions that receive event notifications corresponding to events occurring on one or more of the processing nodes;
      program instructions that queue the received event notifications in one or more queues for delivery to event consumers;
      program instructions that coalesce duplicate event notifications in a single resulting event notification, wherein the event notifications contain an event sequence number stored therein, wherein the program instructions that coalesce further increment the event sequence number by modifying the event sequence number stored in the single resulting event notification to yield a modified event notification that, when provided to one of the event consumers indicates to the one of the event consumers, a total number of original and duplicate events that have been received, and wherein the program instructions that coalesce further comprise program instructions that modify a timestamp stored in the single resulting event notification to match a timestamp stored in a most recent one of the duplicate event notifications, by reading the timestamp of the most recent one of the duplicate event notifications and writing a value of the timestamp of the most recent one of the duplicate event notifications to a storage location of the timestamp stored in the single resulting event notification; and
      program instructions that, at the event consumer, determine whether the event notifications have been duplicated one or more times by reading the event sequence number stored in the event notifications to determine whether the event notifications have been modified to indicate the total number of original and duplicate events that have been received.

16. The computer program product of claim 15, wherein the program instructions that coalesce comprise program instructions that only coalesce sequential duplicate events.

17. The computer program product of claim 16, wherein the program instructions that coalesce comprise:
   program instructions that, responsive to the program instructions that receive having received an event notification, peek in a corresponding queue to determine whether a most recently queued event notification is a duplicate of the received event notification;
   program instructions that, responsive to the program instructions that peek having determined that the most recently queued event notification is not a duplicate of the received event notification, queue the event notification in the corresponding queue without altering the sequence number of the event notification; and
   program instructions that, responsive to the program instructions that peek to having determined that the most recently queued event notification is a duplicate of the received event notification, increment the sequence number of the most recently queued event notification without queuing the received event notification in the queue.

18. The computer program product of claim 15, wherein the program instructions that modify a timestamp are selectively executed in response to a predetermined setting that directs the program instructions for coalescing to update event notification timestamps, wherein if the predetermined setting is not set, the program instructions that coalesce do not set the timestamp of the single resulting event notification to match the timestamp of the most recent of the duplicate event notifications.

19. The computer program product of claim 15, wherein the event notifications are received as callbacks to an application programming interface provided by the file system that implements at least a portion of the event notification method, and wherein the program instructions for queuing are executed in response to receiving the callbacks.

20. The computer program product of claim 18, wherein the program instructions further comprise program instructions that, during registration by the event consumer to receive notifications of events of a given event type, specify a flag that indicates for the given event type and the event consumer, whether the timestamps of coalesced event notifications of the given event type and for the event consumer are to be updated with the timestamp of received event notifications, or whether original timestamps should be preserved, wherein the program instructions that coalesce only modify the timestamp stored in the single resulting event notification if a flag corresponding to an event type and event consumer of the single resulting event notification has been previously set during registration of the event consumer.

* * * * *